United States Patent
Enhoffer et al.

(10) Patent No.: US 6,392,129 B1
(45) Date of Patent: May 21, 2002

(54) MUSICAL INSTRUMENT AND METHOD OF MAKING SAME

(75) Inventors: Raymond Enhoffer, Clifton; Richard Simons, Garfield, both of NJ (US)

(73) Assignee: Latin Percussion, Inc., Garfield, NJ (US)

(*) Notice: Subject to any disclaimer, the term of this patent is extended or adjusted under 35 U.S.C. 154(b) by 0 days.

(21) Appl. No.: 09/679,152

(22) Filed: Oct. 5, 2000

(51) Int. Cl.[7] ............................................. G10D 13/08
(52) U.S. Cl. .............................. 84/402; 84/403; 84/404
(58) Field of Search ........................... 84/402, 403, 404

(56) References Cited

U.S. PATENT DOCUMENTS

| | | |
|---|---|---|
| 276,251 A | 4/1883 | Lesson |
| 1,199,087 A | 9/1916 | Loepsinger |
| 1,199,088 A | 9/1916 | Loepsinger |
| 1,299,430 A | 4/1919 | Da Costa |
| 2,227,757 A | 1/1941 | Loepsinger ..................... 49/77 |
| 2,318,460 A | 5/1943 | Brief ........................... 46/193 |
| D139,510 S | 11/1944 | Allen ........................... D34/15 |
| 2,364,581 A | 12/1944 | Zadek ........................... 46/193 |
| 2,732,986 A | 1/1956 | Whittington ................. 226/20 |
| 3,296,345 A | 1/1967 | Dietz ............................ 264/98 |
| 3,457,694 A | 7/1969 | Tatibana ....................... 53/39 |
| 4,179,973 A | 12/1979 | White ........................... 84/402 |
| 4,290,992 A | 9/1981 | Fujio ........................... 264/163 |
| 4,332,750 A * | 6/1982 | Roggenburg, Jr. et al. . 264/443 |
| 4,926,613 A * | 5/1990 | Hansen ......................... 53/433 |
| 5,138,535 A | 8/1992 | Aragon, Jr. ................. 362/102 |
| 5,483,859 A * | 1/1996 | Singer .......................... 84/322 |
| 5,808,215 A * | 9/1998 | Kralik et al. ................. 84/402 |
| D422,310 S | 4/2000 | Cohen .......................... D19/46 |
| 6,056,464 A | 5/2000 | Cohen .......................... 410/52 |
| D427,001 S | 6/2000 | Cohen ....................... D7/300.2 |
| D428,298 S | 7/2000 | Cohen ....................... D7/300.2 |

FOREIGN PATENT DOCUMENTS

EP      0 341 195      5/1989      ............ G10K/3/00

* cited by examiner

Primary Examiner—Shih-Yung Hsieh
(74) Attorney, Agent, or Firm—Ohlandt, Greeley, Ruggiero & Perle, LLP

(57) ABSTRACT

There is provided a method for producing a musical and/or toy shaker made with a thermoplastic material. The shaker is injection or blow molded in the form of a substantially continuous body that defines an internal, hollow portion. In addition, the body defines a hole or vent that communicates with the hollow portion, thus allowing a fill material to be passed through the vent and deposited in the hollow portion. Significantly, the body in formed with a duct surrounding the vent. Upon filling the hollow portion, the duct is melted in order to seal the vent.

21 Claims, 2 Drawing Sheets

MUSICAL INSTRUMENT AND METHOD OF MAKING SAME

BACKGROUND OF THE INVENTION

1. Field of the Invention

The present invention relates generally to musical instruments and/or toys and processes for making them. More particularly, the present invention relates to a musical instrument and/or toy shaker and processes for making them using moldable plastics.

2. Description of the Prior Art

Molded plastic musical and/or toy shakers are currently made by injection molding, blow molding, or a combination of these two processes. Injection molded shakers typically have two symmetrical sections that are glued together, which results in a seam along the entire circumference of the shaker. On the other hand, blow molded shakers are typically made with a hollow body sealed with a cap, which results in a seam along the rim of the shaker.

Traditional injection or blow molding processes for making plastic molded shakers are inadequate because the processes leave seams on the surface of the shaker. Seams are weak and/or may be pried apart. Thus, traditional injection or blow molding processes produce musical and/or toy shakers that lack durability and/or cannot pass testing for child safety. In addition, seams are unattractive and diminish the perceived value of the shaker.

Also, traditional injection or blow molding processes for making plastic molded shakers are also inadequate because the processes typically require the shaker to have a symmetrical shape, rather than an asymmetrical shape. The asymmetrical shape is, at times, more desirable because it may be more aesthetic, provide or improve the musical quality or tone of the shaker, or look more realistic.

In light of the foregoing, there is a need for a shaker, that can be a musical and/or toy shaker, and that is produced without using typical injection or blow molding. Such a process should allow for asymmetrical shapes and result in a shaker without seams.

SUMMARY OF THE INVENTION

It is an object of the present invention to provide a plastic molded musical and/or toy shaker.

It is another object of the present invention to provide such a musical and/or toy shaker without seams.

It is also an object of the present invention to provide a method for making such a plastic molded musical and/or toy shaker.

It is a further object of the present invention to provide such a method that produces such a musical and/or toy shaker without a seam and without unslightly tap or plug to seal the shaker.

It is still another object of the present invention to provide a method for producing an asymmetrical musical and/or toy shaker.

Accordingly, there is provided a method for producing a musical and/or toy shaker made with a thermoplastic material. The musical and/or toy shaker is injection or blow molded in the form of a substantially continuous body that defines an internal, hollow portion. In addition, the body has a hole or vent that communicates with the hollow portion. The vent allows a fill material to be passed through the vent and deposited within the hollow portion. Significantly, the body in formed with a chimney or duct surrounding the vent. After filling the hollow portion with the fill material, the duct is melted in order to seal the vent.

DETAILED DESCRIPTION OF THE INVENTION

Figure 1:
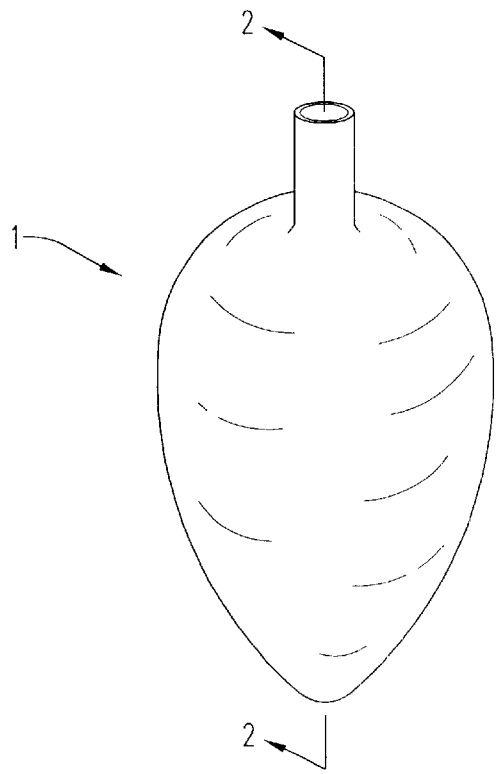
FIG. 1 is a shaker according to the present invention.

Referring to the drawings and, in particular, FIG. 1, there is provided a shaker according to the present invention generally represented by reference numeral 1. The shaker 1 car be either a musical shaker or a toy shaker or a combination thereof.

Figure 2:
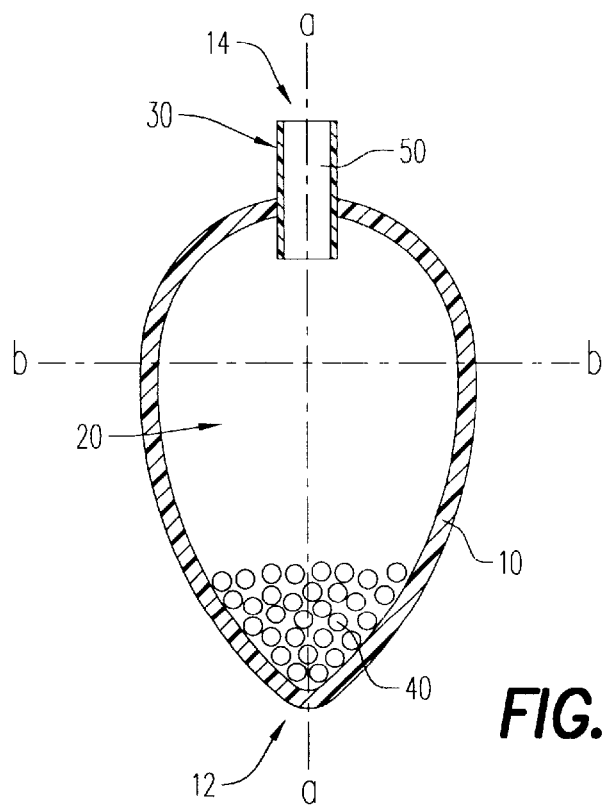
FIG. 2 is a cross-sectional view of the shaker of FIG. 1.

Referring to FIG. 2, shaker 1 preferably has a substantially continuous body 10 that defines a hollow interior portion 20. Through the body of shaker 1, there is an opening, hole or vent 30 that communicates with the interior portion. The vent 30 communicates with hollow portion 20 so that a fill material 40 may pass through the vent and be deposited within hollow portion 20, as shown.

The body 10 may be formed using any suitable material that is plastic or plasticizable. Preferably, body 10 is formed with a thermoplastic material. A preferred thermoplastic material is polyethylene.

The fill material 40 may be any appropriate material.

Such appropriate materials include steel shot, stones, plastic particularly extruded plastic, rice, bee-bees, other non-toxic materials, or any combinations thereof. The fill material is preferably steel shot. Most preferably, the steel shot is one hundred percent steel shot. This one hundred percent steel shot fill material is non-toxic thereby making it particularly suitable for as a toy shaker.

A significant aspect of the present invention is chimney or duct 50, which surrounds vent 30. Preferably, duct 50 is formed during the molding of body 10. Thus, it would be integrally connected to body 10 in the preferred embodiment. Optionally, duct 50 may be disposed about vent 30 after body 10 is initially molded. Accordingly, duct 50 must sized to permit fill material 40 to pass through vent 30. For example, if fill material 40 was steel shot with an average diameter of about 2 mm, the cross-section of duct 50 would be at least about 2 mm and, preferably, about 4 mm. Duct 50 may end at the periphery of body 10 or may extend through vent 30 and partially into portion 20, as shown in FIG. 2. Preferably, duct 50 extends through vent 30 and partially into portion 20.

Duct 50 is made of a plasticizable or plastic material, such as a thermoplastic material. Preferably, the material 's the same as that used to for body 10. However, duct 50 can be made of a second or different plasticizable material that nonetheless will be consistent with the teachings of the prose, invention.

The shaker 1 may be formed into numerous shapes and sizes. The sound and/or the look of the shaker will dictate the overall shapes and dimensions of the shaker. However, for musical instruments or shakers, the shape of the shaker is preferably asymmetrical. A preferred shape of shaker 1 is shown in the Figures. Referring to FIGS. 1 and 2, shaker 1 has a cross-section a—a, that is defined by a first end 12 and a second end 14, and a second cross-section, indicated generally as b—b, that is between ends 12 and 14. Axis a—a is a lateral axis and is basically perpendicular to axis b—b.

As shown, the portion of shaker 1 between second end 14 and cross-section b—b, is substantially spherical, while the portion of shaker 1 between cross-section b—b and first end 12 is conical or substantially conical-shaped. Thus, shaker 1 resembles a chicken egg. Preferably, the "egg-shaped" shaker 1 is approximately 2 inches in length between ends 12 and 14 along cross section a—a, and one and one-half inches in diameter along cross-section b—b. Thus, shaker 1 is preferably shaped to fit substantially within the palm of a user's hand. However, the shaker 1 can also be readily mounted on to a handle or other mechanism for shaking the shaker.

The following is a preferred process for making shaker 1. The body 10 is molded using any appropriate molding process and/or apparatus. Such molding processes include, but are not limited to, an injection or a blow molding process. The body 10 is molded to form an internal hollow portion 20 with a vent 50. Preferably, duct 50 is integrally and simultaneously molded with body 10. The duct 50 extends or flares away from body 10 and is in communication with vent 30. The duct 50 can, however, be molded separately and then secured to body 10.

After body 10 is molded, it is positioned in a fixture below a fill tube or a funnel that is preferably sized is matingly fit with duct 50. The fill material 40 is passed from a hopper into hollow portion 20 through the funnel, duct 50, and vent 30. Preferably, the funnel has a vibrator to facilitate filling of body 10. A small auger may be used to measure the amount of fill material 40 that is deposited within body 0.

After body 10 is filled, a heating mechanism, such as, for example, a heated finishing die, melts duct 50 and pushes an amount of the resulting flowable thermoplastic material into vent 30. When the thermoplastic material in vent 30 is solidified, a seal in formed over the vent.

Figure 3:
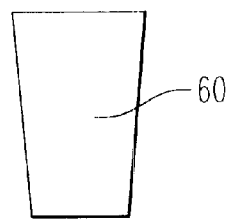
FIG. 3 is a plug for use with the shaker of FIG. 1.

Optionally, a plug 60, shown in FIG. 3, may be inserted into duct 50 after fill material 40 is inserted into portion 20, but before closing of vent 30. The plug 60 preferably extends into the interior of the hollow portion 20 with the excess material that extends above the surface of the exterior surface of the body 1 being used, along with duct 50, to seal vent 30. Preferably, plug 60 is tapered to facilitate its insertion and securement in duct 50 and vent 30. Also, plug 60 would provide additional strength to the seal produced in vent 30.

Once plug 60 is inserted, the heated finishing die then melts duct 50, as well as the top of the plug beyond the periphery of body 1, and pushes an amount of the resulting flowable thermoplastic material toward vent 30.

The finishing die, or a second die, is preferably adapted to substantially match the shape or contour and texture of the seal formed over vent 30 to the shape or contour and texture of body 10. Basically, the melted duct 50 visually appears to be or almost to be an integral part of the shape/contour and texture of the exterior surface of the body. Optionally, a heated intermediate die may be applied before the finishing die. Of course, the temperature of the die or dies depends upon the particular material used for body 10.

Figure 4:
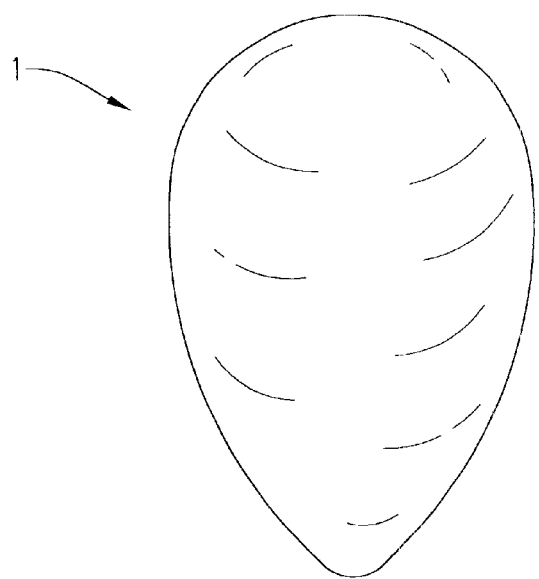
FIG. 4 is the shaker of FIG. 1 shown after the duct has been plasticized.

The finished musical and/or toy shaker 1 has a sealed vent that is both strong, whether with or without the plug, and substantially unnoticeable, as shown in FIG. 4. In addition, the seal will pass presently established toy test criteria. Further, the shaker 1 can have any configuration, including desired asymmetrical configurations, yet it will not easily break when dropped.

The present invention having been thus described with particular reference to a preferred form thereof, it will be obvious that various changes and modifications may be made therein without departing from the spirit and scope of the present invention as defined in the appended claims.

Wherefore we claim:

1. A process for making a shaker from an integral body defining a hollow interior portion and a hole through which a fill material is passed into said interior portion, the process comprising:

placing a duct made from a plasticizable material in communication with said hole and extending into said interior portion;

depositing a fill material in said interior portion;

plasticizing said plasticizable material to direct an amount of said plasticizable material into said hole; and forming a seal over said hole by solidifying said amount of plasticizable material.

2. The process of claim 1, wherein the shaker is a musical shaker.

3. The process of claim 1, wherein the shaker is a toy shaker.

4. The process of claim 1, wherein said body is formed from a plasticizable material.

5. The process of claim 1, wherein said body is formed from a thermoplastic material.

6. The process of claim 1, wherein said fill material is selected from the group consisting of steel shot, stones, plastic, rice, bee-bees, and combinations thereof.

7. The process of claim 1, wherein said fill material is one hundred percent steel shot.

8. The process of claim 1, wherein said duct is molded with said body.

9. The process of claim 1, further comprising applying a heat source to said plasticizable material to plasticize the plasticizable material.

10. The process of claim 9, wherein said heat source comprises a die having an inner surface adapted to push said plasticizable material into said hole.

11. The process of claim 10, wherein said inner surface is adapted to substantially match the surface of said seal to the shape of said body.

12. An integral body that is made into a shaker comprising:

an exterior wall defining a hollow interior portion and a hole through which a fill material is passed into said interior portion; and a duct in communication with said hole and extending into said body, said duct formed by a plasticizable material, whereby said duct is plasticized and used to form a seal over said hole.

13. The body of claim 12, wherein said exterior wall is made from a plasticizable material.

14. The body of claim 13, wherein said plasticizable material is a thermoplastic material.

15. The body of claim 14, wherein said duct is also made from a second plasticizable material.

16. The body of claim 14, wherein said plasticizable material and the second plasticizable material are the same.

17. A musical instrument comprising:

an integral body defining a hollow interior portion and a hole through which a fill material is passed into said hollow interior portion, whereby said hole is sealed by a plasticizable material integrally and simultaneously molded with said body.

18. The musical instrument of claim 17, wherein said body has a first end and a second end that define a lateral axis therebetween, said body having a length about 2 inches extending along said lateral axis, and wherein said body has a maximum cross-sectional width of about 1.5 inches.

19. The musical instrument of claim 17, wherein said body resembles the shape of a chicken egg.

20. A musical instrument comprising:

a one-piece body having a hole and a hollow interior portion, said one-piece body having an exterior surface wherein said hole is closed by a plasticizable material so that said exterior surface has no protuberances.

21. The musical instrument of claim 20, wherein a fill material may be passed into said hollow interior portion through said hole.

* * * * *